Patented Dec. 6, 1932

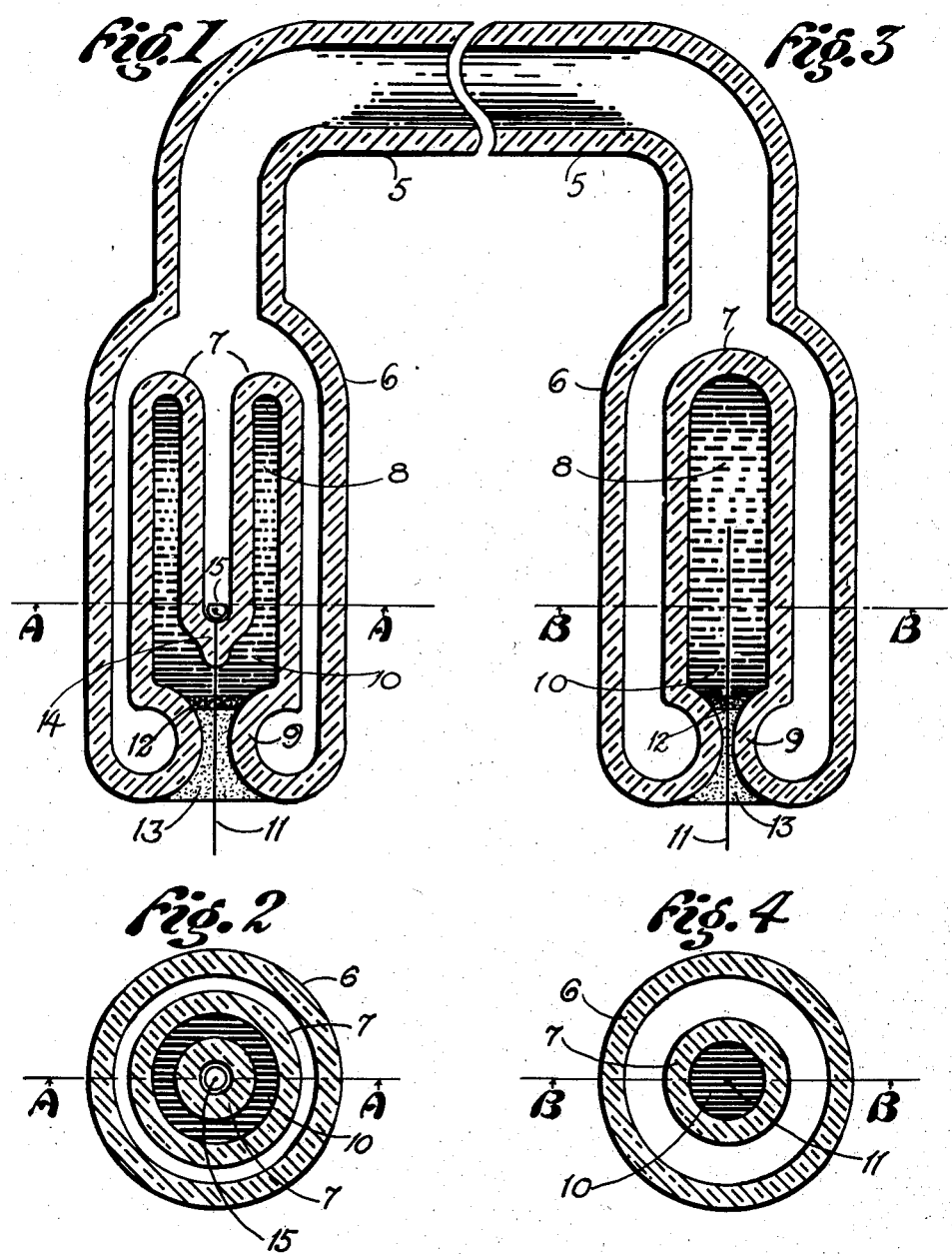

1,890,402

UNITED STATES PATENT OFFICE

MELVIN G. MORRIS, OF HOUSTON, TEXAS, ASSIGNOR, BY MESNE ASSIGNMENTS, TO CLAUDE NEON LIGHTS, INC., OF NEW YORK, N. Y., A CORPORATION OF NEW YORK

MERCURY LUMINESCENT TUBE ELECTRODE

Application filed August 13, 1928. Serial No. 299,308.

This invention relates to improvements in electrodes for use in luminescent tubes containing an atmospheric conducting medium which may be from either the active, common, or diatomic group, including nitrogen, hydrogen, oxygen, carbon monoxide, and carbon dioxide, or the rare, inert, or monatomic group, including commercial neon, helium, argon, krypton, xenon, niton, and the like, and which when excited by a high voltage electric current gives forth a glow varying in color according to the characteristics of the particular gas or mixture of gases, and of value for advertising and ornamental display purposes.

In the manufacture and commercial use of luminescent tubes of the ionic discharge type, great difficulty has been experienced in attempting to produce and maintain tubes of long life with constant brilliancy. The physical and chemical absorption of the gaseous conducting medium by the internal metallic electrodes is largely responsible for this condition. In addition to this difficulty the electrodes contain occluded detrimental foreign gases which jeopardize the life of the tube by contaminating the conducting gas. In removing these occluded gases from the electrodes a method of heating is employed while the tube is connected to an exhaust pump. In this process as well as in the commercial operation of the tubes the electrodes sputter and plate-out with the resultant metallic discharge being lodged on the interior walls of the tubes and thus forming additional surface for absorption of the conducting gaseous medium. These conditions lessen the pressure and enfeeble the discharge to such an extent that it eventually stops altogether and consequently extinguishing the glow.

It is the object of this invention to provide electrodes of such a character as not to come in direct contact with the gaseous medium within the tube and thereby overcome the detrimental results of disintegration, sputtering and plating-out. With the use of this invention electrodes need not be degasified as they do not come in direct contact with the gaseous conducting medium. Their separation from the conducting gas also prevents the formation of metallic gas absorbing coatings on the interior walls of the tube in close proximity of the electrodes.

Further objects and advantages of the invention will be apparent as it is better understood by reference to the following specification and accompanying drawing in which—

Fig. 1 shows a view in elevation of one form of external liquid glass electrodes that may be used to overcome present difficulties in maintaining longer life in luminous tubes, and Fig. 2 is a cross section on the line A—A of Fig. 1.

Fig. 3 shows a view in elevation of another form of external liquid electrode that may be used for the same purpose and with the same resultant advantages, and Fig. 4 is a cross section on the line B—B of Fig. 3.

In the manufacture of this new type liquid-glass electrodes, commercial tubing 5 of lime, lead, or pyrex glass is used with ends 6 and 7 enlarged and inverted so as to form chambers 8 on the inside of the enlarged ends. These chambers while enclosed within the enlarged ends do not open up in any way to the interior of the tube. They contain a neck 9 or mouth which is a continuation of the enlarged tube 6 which permits of an easy means of admitting a liquid conductor, such as mercury, referred to later.

Luminous tubes of this invention are fashioned into the particular letters or design desired with inverted glass chambers as described. The tubes are then exhausted to as high degree of vacuum as is possible and then filled with the desired conducting gas in such a way as is well known to the art. The tube is then sealed off from the manifold of the exhaust system and a liquid conductor such as mercury, is admitted to the chambers 8 through the neck 9 of the chamber. A suitable lead-in wire 11 is inserted in the mercury 10 and held rigid in a central location by means of a flexible collar 12 which is sealed in air tight with suitable sealing compound 13. Fig. 1 is different from Fig. 3 in that the lead-in wire 11 which makes contact with the mercury continues through the chamber wall 7 at 14 and supports a small metallic receptacle 15 containing minute particles of a getter, such as magnesium or caesium. This getter receptacle has an area of approximately one square decimeter per ampere of current and is connected to the current supply source for the purpose of vaporizing the magnesium or caesium. The object of creating this getter vapor is to provide a means of continuous purification for those gases which require a high degree of purity for successful commercial use.

I claim as my invention—

1. The combination with a luminescent tube containing an atmospheric gas or vapor of a reentrant glass chamber containing a conducting liquid exterior to the tube, a lead-in wire in contact with the liquid, and a conducting receptacle in the tube containing a gettering substance such as metallic magnesium or caesium for the purpose of purification.

2. A gas filled luminous tube with reentrant ends containing conducting liquid exterior to the tube, and forming condenser type electrodes through which electric current may be inducted into the tube for ionization of the gaseous medium.

3. A device of the character described comprising a luminescent gas filled tube, an enlarged electrode bearing extremity at one end thereof, a reentrant chamber in the extremity, and a conducting liquid electrode in the chamber exterior to the tube.

4. A device of the character described comprising a luminescent gas filled tube, an enlarged electrode bearing extremity at one end thereof, a reentrant chamber in the extremity, a restricted portion in the chamber, a conducting liquid electrode in the chamber exterior to the tube, a seal in the restricted portion, and an electrode carried by the seal.

5. A device of the character described comprising a luminescent gas filled tube, enlarged electrode bearing extremities at either end of the tube, reentrant chambers in the extremities, and conducting liquid electrodes in the chambers exterior to the tube.

6. A device of the character described comprising a luminescent gas filled tube, an enlarged electrode bearing extremity at one end thereof, a reentrant chamber in the extremity, a second reentrant portion formed in the chamber and communicating with the tube, and a conducting liquid in the chamber surrounding the second reentrant portion exterior of the tube.

7. A device of the character described comprising a luminescent gas filled tube, an enlarged electrode bearing extremity at one end thereof, a cylindrical reentrant chamber in the extremity, a second cylindrical reentrant portion formed in the chamber and communicating with the tube, whereby a portion of the chamber will be substantially annular in cross section, and a conducting liquid in the chamber surrounding the second reentrant portion exterior of the tube.

8. A device of the character described comprising a luminescent gas filled tube, an enlarged electrode bearing extremity at one end thereof, a reentrant chamber in the extremity, a liquid electrode in the chamber exterior to the tube, a conducting member connected with the electrode and extending through the chamber forming portion of the tube and into the latter, and a getter carried by the conducting member within the tube.

9. A device of the character described comprising a luminescent gas filled tube, an enlarged electrode bearing extremity at one end thereof, a reentrant chamber in the extremity, a second reentrant portion formed in the chamber and communicating with the tube, a conducting member connected with the electrode and extending through the second reentrant portion into the tube, and a getter carried by the conducting member within the tube.

10. A device of the character described comprising a luminescent gas filled tube, an enlarged electrode bearing extremity at one end thereof, a reentrant chamber in the extremity, a second reentrant portion formed in the chamber and communicating with the tube, a conducting member connected with the electrode and extending through the second reentrant portion into the tube, a receptacle formed on the extremity of the conducting member within the tube, and a getter carried by the conducting member within the tube.

11. A luminous gas discharge tube with reentrant ends forming external pockets containing mercury.

MELVIN G. MORRIS.